United States Patent [19]

Brophy

[11] Patent Number: 5,794,708
[45] Date of Patent: Aug. 18, 1998

[54] TRIANGULAR CROSS SECTION TRENCHING APPARATUS FOR EDGING

[75] Inventor: Robert C. Brophy, Raymond, Nebr.

[73] Assignee: Turfco Manufacturing, Incorporated, Minneapolis, Minn.

[21] Appl. No.: 634,811

[22] Filed: Apr. 19, 1996

[51] Int. Cl.$^6$ .................................................. A01B 45/04
[52] U.S. Cl. ........................... 172/19; 172/42; 172/93; 172/95
[58] Field of Search .................... 172/19, 20, 766, 172/768, 101, 42, 84, 85, 91, 92, 93, 95, 97

[56] References Cited

U.S. PATENT DOCUMENTS

| | | |
|---|---|---|
| 1,690,944 | 11/1928 | Peterson . |
| 1,770,434 | 7/1930 | Schleicher . |
| 2,158,580 | 5/1939 | Houser . |
| 2,164,246 | 6/1939 | Kirkpatrick . |
| 2,284,826 | 6/1942 | Kroeger . |
| 2,506,371 | 5/1950 | Lint . |
| 2,707,829 | 5/1955 | Fisk . |
| 3,034,586 | 5/1962 | Ditter . |
| 3,509,944 | 5/1970 | Brouwer et al. ............... 172/19 |
| 4,015,666 | 4/1977 | Brouwer et al. ............... 172/19 |
| 4,018,287 | 4/1977 | Brouwer . |
| 4,029,152 | 6/1977 | Gerrits . |
| 4,310,053 | 1/1982 | Pearce .......................... 172/20 |
| 4,553,606 | 11/1985 | Arnold .......................... 172/19 |
| 4,982,800 | 1/1991 | Shields . |

FOREIGN PATENT DOCUMENTS

| | | | |
|---|---|---|---|
| 110527 | 5/1940 | Australia | 172/19 |

*Primary Examiner*—Terry Lee Melius
*Assistant Examiner*—Christopher J. Novosad
*Attorney, Agent, or Firm*—Peterson, Wicks, Nemer & Kamrath, P.A.

[57] ABSTRACT

A sod cutting machine in combination with turf cutting mechanism for cutting a longitudinally elongated trench in turf that has a trench bottom transversely inclined relative to the slope of the soil transverse to the direction of the trench elongation. The sod cutting machine has mounting arms mounted to the machine frame to extend vertically downwardly in a turf cutting position the same distance. The turf cutting mechanism includes first and second vertical knives that each has a rear shank portion joined to the lower end of the respective arm, a generally horizontal bottom edge portion and a front inclined sharpened edge that intersects with the bottom edge portion. A transverse bottom cutting knife extends between and is joined to the first and second vertical knives with one end portion vertically more remote from one of the arms than the other cutting knife end portion from the other one of the arms.

11 Claims, 2 Drawing Sheets

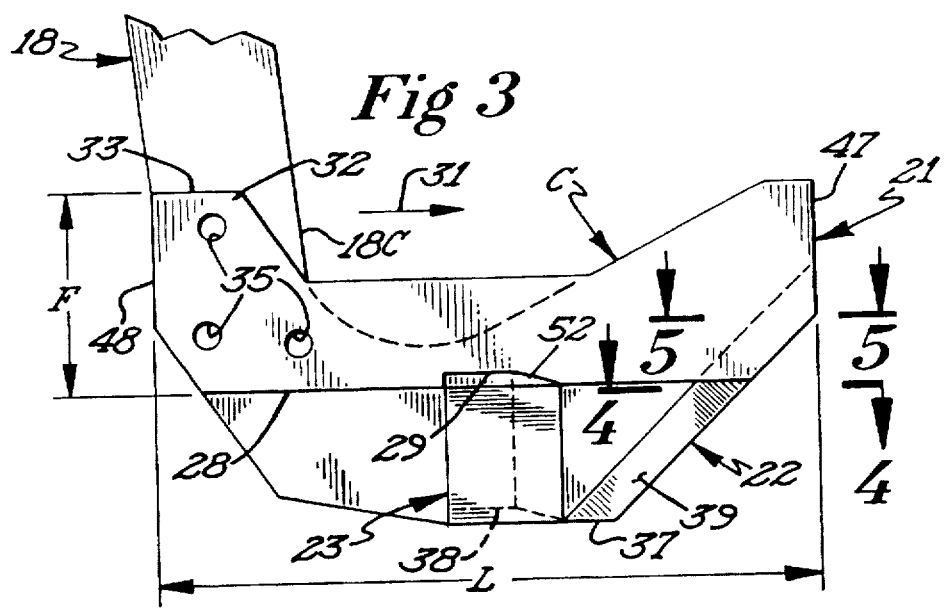
Fig 3
Fig 4
Fig 5
Fig 6
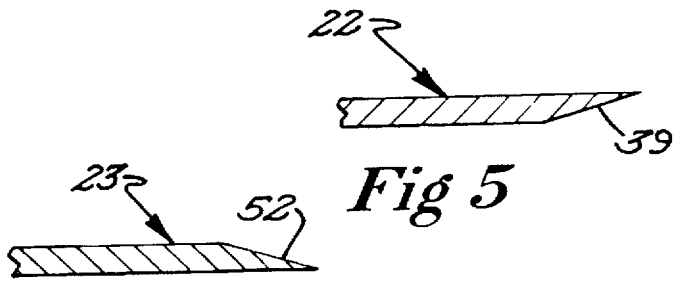
Fig 7
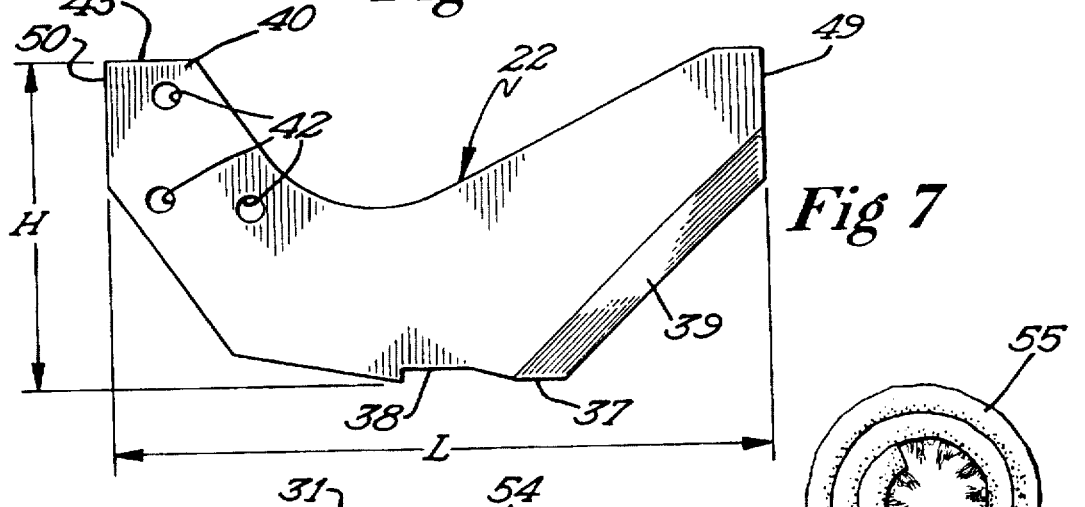
Fig 8

5,794,708

1

TRIANGULAR CROSS SECTION TRENCHING APPARATUS FOR EDGING

BACKGROUND OF THE INVENTION (1) Field of the Invention

This invention relates to apparatus for cutting trenches, and particularly for cutting trenches for edging.

(2) Description of the prior art

Bricks or blocks are often used as an edging. At times, it is desirable to provide an elongated trench that is triangularly shaped in cross section in the soil and then bricks or blocks are placed an the trench in side by side relationship for the length of the trench to form the edging.

Rotary cutters have been used to cut such a triangular shaped trench for having bricks or blocks placed therein providing an edging for landscaping or other purposes. However, in doing so, dirt and grass is scattered everywhere adjacent to the cut and requires considerable time for cleaning up the scattered material. Also, conventional sod cutters have been used for cutting sod wherein two vertical knives are reciprocated or oscillated to cut vertical edges in the soil while a horizontal knife extends between the two vertical knives to make a cut parallel to the top surface. Then the sod is rolled up and removed in a conventional manner.

In order to overcome problems with prior cutting apparatus, this invention has been made.

SUMMARY OF THE INVENTION

The apparatus of the most preferred form utilizes a conventional sod cutting machine together with a turf cutting mechanism mountable to the sod cutting machine for mechanically cutting a trench in the soil. Advantageously, the sod cutting machine is of a self propelled type with a mechanism for oscillating its turf cutting mechanism mounting arms and thereby the turf cutting mechanism. The turf cutting mechanism includes a first vertical knife, a second vertical knife that is of a greater vertical dimension than the first knife and a transverse trench bottom cutting knife that extends between the vertical knives and mounted thereto to extend at an angle that is transversely inclined to the surface of the ground in which a trench is being cut for having suitable landscape or other suitable edging placed in the trench.

One of the objects of this invention is to provide new and novel means for cutting a trench in soil for having suitable edging members placed therein. Another object of this invention is to provide a new and novel turf cutting mechanism mountable to a sod cutting machine for cutting a trench in soil. In furtherance of the last mentioned object, it is another object of this invention to provide new and novel means for cutting a longitudinally elongated trench having a trench bottom that is transversely inclined relative to the transverse slope of the surface of the turf in which the trench is being cut. Still another object of this invention is to provide a new and novel method of installing edging in the ground for landscaping purposes.

Figure 2:
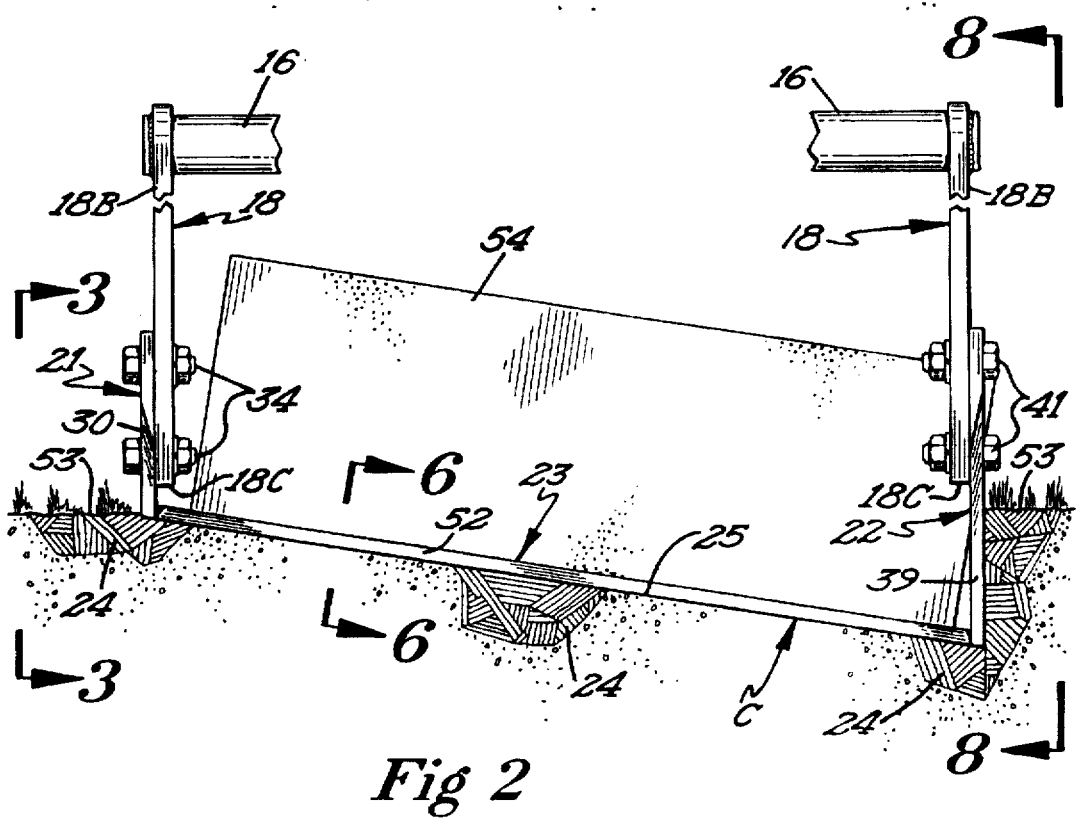
FIG. 2 is a front view of the mounting arms and turf cutting mechanism of this invention cutting a trench together

2 with a block placed in the trench that has been cut, with a vertical intermediate portion being broken away;

FIG. 3 is a side view of the turf cutting mechanism that is generally taken along the line and in the direction of the arrows 3—3 of FIG. 2 other than that the bolts for mounting the first vertical knife to the adjacent mounting arm are not shown;

FIG. 4 is a fragmentary cross sectional view of the second vertical knife that is generally taken along the line and in the direction of the arrows 4—4 of FIG. 3;

FIG. 5 is a fragmentary cross sectional view of the first vertical knife that is generally taken along the line and in the direction of the arrows 5—5 of FIG. 3;

FIG. 6 is a fragmentary cross sectional view of the transverse bottom cutting knife that is generally taken along the line and in the direction of the arrows 6—6 of FIG. 2;

FIG. 7 is a side view of the second vertical knife; and

FIG. 8 is a somewhat diagrammatic view showing the turf being rolled up in the trench that has been cut and blocks in the cut trench from which the turf has been removed, with a horizontal intermediate part being broken away.

DETAILED DESCRIPTION

Figure 1:
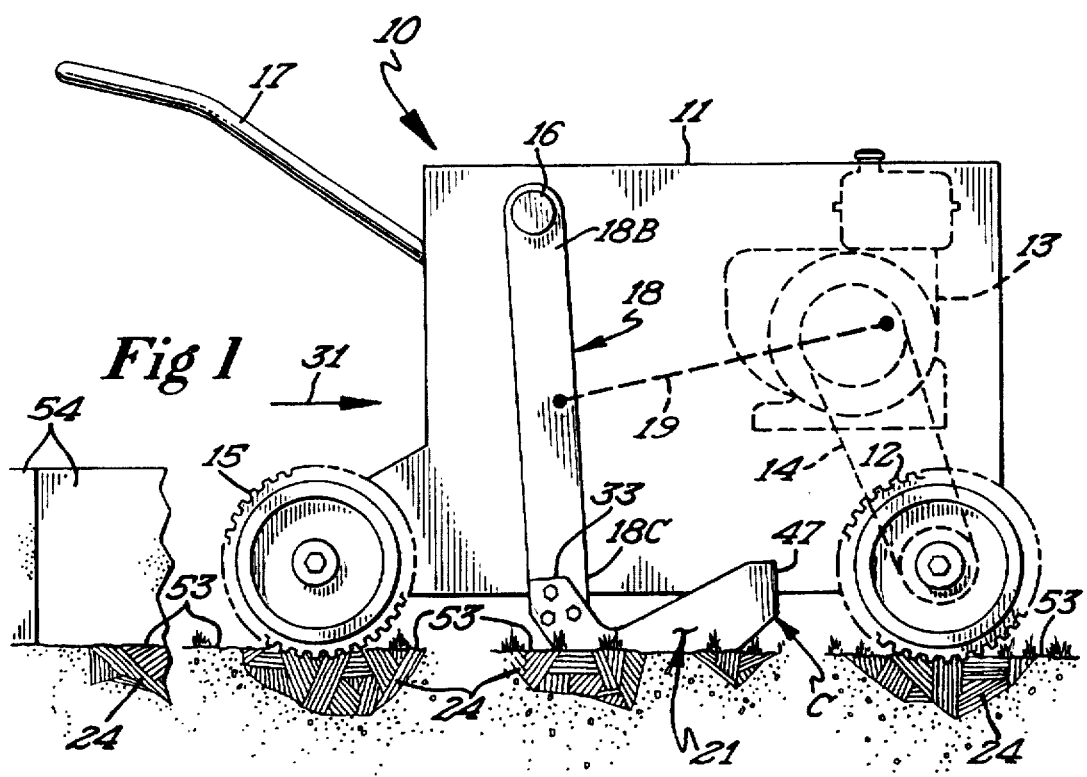
FIG. 1 is a somewhat diagrammatic side view of a self propelled sod cutting machine having a turf cutting mechanism mounted thereto together with a showing of a plurality of the edging blocks in the trench cut by the cutting mechanism, with a horizontal intermediate part of the turf not being shown.

Referring in particular to FIGS. 1 and 2, the self propelled, conventional sod cutting machine, generally designated 10, which is somewhat diagrammatically illustrated, includes a frame 11 that is mounted for movement in a longitudinal forward direction (arrow 31) by front wheels 12 and rear wheels 15. A motor or engine 13 is mounted to the frame and is drivingly connected through a conventional drive connection 14 to one set of the wheels, for example the front wheels. A handle 17 is connected to the frame for controlling the direction of movement of the machine 10.

Elongated mounting arms 18, which are of the same lengths, have their upper ends 18B mounted to the frame 11 for movement in a conventional manner between a datum position and a generally vertically extending turf cutting position by a suitable arm mount(s) 16. A suitable drive connection 19 is connected between the engine and at least one of the arms 18 and/or the arm mounts 16 for oscillating the mounting arms 18 in a conventional manner. The arms 18 are parallel to one another and have their lower ends 18C extending the same vertical distance downwardly below the plane of the axes of rotation of the front and rear wheels when the arms extend downwardly at the same angle to the vertical and are in their turf cutting position such as shown in FIG. 1.

For cutting a strip of turf to create a trench 25 in the soil 24, cutting mechanism C is mounted to the lower ends 18C of the mounting arms for being oscillated therewith. The cutting mechanism includes a first vertical knife, generally designated 21, a second vertical knife, generally designated 22, that is parallel to the first vertical knife and a transversely elongated, trench bottom cutting knife 23 that at one end is mounted to the first vertical knife and at the opposite end is mounted to the second vertical knife.

Referring to FIG. 3, the first vertical knife 21 is longitudinally elongated and has a horizontal bottom edge 28 with a bottom knife cut out 29 opening therethrough. A sharpened knife edge 30 intersects with and extends diagonally upwardly from the bottom edge in a forward direction (arrow 31). Further, the first vertical knife 21 has a rear shank portion 32 that has a top horizontal edge 33 and apertures 35 for being bolted at 34 or otherwise suitably removably secured to the lower end of the adjacent mounting arm 18.

Referring to FIG. 7, the second vertical knife 22 is longitudinally elongated and has a horizontal bottom edge 37 with a bottom knife cut out 38 opening therethrough. A sharpened knife edge 39 intersects with and extends diagonally upwardly from the bottom edge in a forward direction (arrow 31). Further, the second vertical knife 22 has a rear shank portion 40 that has a top horizontal edge 43 and apertures 42 for being bolted at 41 or otherwise suitably removably secured to the lower end of the adjacent mounting arm 18. The angle of inclination of the sharpened knife edge 30 of the first vertical knife relative to its bottom edge 28 is substantially the same as that of the sharpened knife edge 39 of the second vertical knife relative to its bottom edge 37. However, the inclined length of the sharpened length of the sharpened knife edge 39 is substantially greater than that of the sharpened knife edge 30.

When the first and second vertical knives are bolted to the respective mounting arm, the knives 21 and 22 have generally parallel, adjacent surfaces that are longitudinally elongated and are perpendicular to the plane of the axes of rotation of the front and rear wheels.

Advantageously, the horizontal spacing L of the front vertical edge 47, which intersects the knife edge 30, from the rear vertical edge 48 of the first vertical knife is the same as the horizontal spacing L of the front vertical edge 49, which intersects the knife edge 39, from the rear vertical edge 50 of the second vertical knife 22. However, the vertical dimension F between the top horizontal edge 33 of the shank portion 32 and the bottom horizontal edge 28 of the first vertical knife is substantially less than the vertical dimension H between the top horizontal edge 43 of the shank portion 40 and the bottom horizontal edge 37 of the second vertical knife. Further, the vertically spaced relationship of the apertures 35 relative to the top horizontal edge 33 is desirably the same as the vertically spaced relationship of the apertures 42 relative to the top horizontal edge 43. Likewise, the spacing of the apertures 35 from one another is the same as the spacing of the apertures 42 from one another. Thus, when the mounting arms are in their turf cutting position, the bottom edge of the first vertical knife is located substantially more closely adjacent to the arm mounts 16 than the bottom edge of the second vertical knife. Accordingly, in transverse vertical cross section, the bottom cutting knife extends relative to the adjacent vertical surfaces of the vertical knifes at an acute angle relative to the vertical knife 22 and an obtuse angle relative to the vertical knife 21.

Advantageously the maximum thickness of the bottom cutting knife 23 is no greater than the maximum vertical dimension of each of the vertical knife cutouts. The knife 23 has a sharpened front edge 52.

Assuming the surface 53 of the soil in which the trench is being cut is substantially horizontal, the edge 28 of the first vertical knife is horizontal and rides on the surface 53, the bottom of the bottom edge 37 of the second vertical knife is horizontal and at a substantial depth below the surface 53, and the bottom of the bottom cutting knife is transversely inclined at an acute angle relative to the surface 53 in a direction transversely downwardly away from knife 21. For example, the angle may be about 5 to 30 degrees, depending upon the edging effect desired and the dimensions of the edging material placed in the trench. As a result, as the cutting mechanism is oscillated and the sod cutting machine is moving forwardly in the direction of arrow 31, a triangular trench 25 is cut and elongated lengths of turf that are generally triangular in transverse cross section are cut and then removed. For example, lengths of turf may be rolled, a partial roll of turf being indicated as 55 in FIG. 8, to facilitate handling the turf. In rolling the strip of sod, the turf including soil entrapped in the roots are rolled as a single unit. As a result, the soil together with roots are removed to leave a trench with no or very little scattering of dirt and other debris adjacent to the trench.

After the turf is removed from the trench, blocks or bricks 54 are placed in the trench to provide the desired edging. If the blocks are of generally rectangular box shape, then the blocks would be transversely inclined the same amount as the inclination of the trench bottom with one transverse end surface of each block extending to a significantly higher elevation above the surface 53 than the other transverse surface of each block.

In the event during the cutting of a trench, the horizontal bottom edge 28 of the first vertical knife is at an elevation below the soil surface 53, then the elongated lengths of turf being cut would be trapezoidal in transverse cross section as would be the transverse shape of the resulting trench.

Further, even though the block 54 has been referred to as being of rectangular box shape, it is to be understood it can be of other shapes. Also, if it is desired that the angle of transverse inclination be increased, then a second vertical knife 22 which is of a greater height dimension H than the one shown would be used.

Advantageously, the horizontal bottom edge 28 including the length of the cut-out 29 of the first vertical knife 21 is substantially greater than the horizontal bottom edge 37 including the length of the cut-out 38. Further, it is to be understood that the edges 33, 43 of the vertical knives 21, 22 do not have to be horizontal as long as the spacing of the apertures 35, 42 from the respective bottom edge 28, 37 in a direction perpendicular to a straight line extension of the respective bottom edge remains the same.

As may be seen from FIG. 3, the maximum dimension of the second vertical knife in a direction perpendicular to its bottom edge is substantially greater than the corresponding dimension of the first vertical knife. As one example of the invention, but not otherwise as a limitation thereof, the maximum dimension of the second vertical knife may be about 4½ inches and that of the first blade may be about 2¾ inches while the transverse dimension of the bottom cutting knife may be about 12½ inches. However, these dimensions may be varied depending on the desired transverse inclination of the trench bottom, the transverse dimension of the trench and the height of the trench wall or walls.

Even though the arms 18 have been indicated being of the same lengths and the first and second vertical knives being of different vertical heights, it is to be understood that the first and second vertical knives may be of the same vertical dimensions. However, if the first and second vertical knives are of the same vertical dimensions, than (a) one of the mounting arms 18 is modified to be shorter than the other, or (b) one vertical knife is attached to one mounting arm to be more closely adjacent to the arm mounts 16 than the attachment of the other vertical knife to the other mounting arm relative to the arm mounts, or (c) the bottom cutting knife has one end portion attached to the first vertical knife more closely adjacent to the arm mounts 16 than the other end portion of the bottom cutting knife is joined to the second vertical knife. In any event, when the mounting arms are in their sod cutting position, the bottom cutting knife would be transversely inclined relative to the surface such as indicated in FIG. 2.

What is claimed is:

1. Mechanism for cutting a trench in turf when moved in a forward direction and adapted for attachment to a cutting machine, comprising a first vertical knife, a second vertical knife substantially parallel to the first vertical knife, each of the first and second vertical knives having a vertical surface, a front sharpened edge, a shank mounting portion and a bottom edge portion, with each of the shank mounting portions having shank means for facilitating the attachment of the respective one of the first and second vertical knives to the cutting machine, with the bottom edge portion of each vertical knife being of a maximum spacing in a vertical downward direction from the respective shank means, and a bottom cutting knife having a first end portion joined to the first vertical knife adjacent to the first knife bottom edge portion, a second end portion joined to the second vertical knife adjacent to the second knife bottom edge portion and a front sharpened edge extending between the first and second vertical knives, with the bottom cutting knife being planar between the first and second end portions, with the maximum spacing of the first vertical knife in a vertical direction being substantially less than the maximum spacing of the second vertical knife in a vertical direction, with the vertical surface of the first vertical knife from the shank mounting portion to the bottom edge portion being generally parallel to the vertical surface of the second vertical knife from the shank mounting portion to the bottom edge portion.

2. The mechanism for cutting a trench in turf of claim 1 wherein each of the shank means includes a plurality of bolt apertures.

3. The mechanism for cutting a trench in turf of claim 1 wherein the included angle between the bottom cutting knife and the vertical surface of the first vertical knife is an obtuse angle and the included angle between the bottom cutting knife and the vertical surface of the second vertical knife is an acute angle.

4. The mechanism for cutting a trench in turf of claim 1 further comprising, in combination: the cutting machine including a frame, soil engaging wheels mounted to the frame, an engine mounted to the frame, vertically elongated first and second mounting arms movable between a datum position and a turf cutting position, said mounting arms having upper ends and lower ends, means for mounting the upper ends of the mounting arms to the frame for movement relative to the frame, and means connected between the engine and the mounting arms for oscillating the mounting arms, with the shank means of the first vertical knife mounting the first vertical knife to the first arm lower end and the shank means of the second vertical knife mounting the second knife to the second arm lower end.

5. Mechanism for cutting a trench in turf when moved in a forward direction and adapted for attachment to a cutting machine, comprising, in combination: a first vertical knife; a second vertical knife substantially parallel to the first vertical knife, with each of the first and second vertical knives having a front sharpened edge, a shank mounting portion and a bottom edge portion, with each of the shank mounting portions having shank means for facilitating the attachment of the respective one of the first and second knives to the cutting machine, with the bottom edge portion of each vertical knife being of a maximum spacing in a vertical downward direction from the respective shank means; and a bottom cutting knife having a first end portion joined to the first vertical knife adjacent to the first knife bottom edge portion, a second end portion joined to the second vertical knife adjacent to the second knife bottom edge portion and a front sharpened edge extending between the first and second vertical knives, with the maximum spacing of the first vertical knife in a vertical direction being substantially less than the maximum spacing of the second vertical knife in a vertical direction; wherein each vertical knife has a bottom knife mounting knife cut-out opening downwardly through the respective vertical knife bottom edge portion that is of substantially the same size and shape as the knife cut-out of the other vertical knife.

6. The mechanism for cutting a trench in turf of claim 5 wherein the front sharpened edge of each of the first and second vertical knives is inclined at an angle to the respective vertical knife bottom edge portion for a length and at substantially the same angle as the front sharpened edge of the other vertical knife, with the front sharpened edge of each of the first and second vertical knives intersecting the bottom edge portion of the respective vertical knife, and the length of the front sharpened edge of the first vertical knife being substantially less than the length of the front sharpened edge of the second vertical knife.

7. For cutting an elongated trench in turf, a combination of a sod cutting machine and turf cutting mechanism, the sod cutting machine including a frame, soil engaging wheels mounted to the frame, an engine mounted to the frame, vertically elongated first and second mounting arms movable between a datum position and a turf cutting position, said mounting arms having upper ends and lower ends, means for mounting the upper ends of the mounting arms to the frame for movement relative to the frame, and means connected between the engine and the mounting arms for oscillating the mounting arms; and the turf cutting mechanism including a first vertical knife having a vertical surface, a front edge, a bottom edge portion and means joined to the first mounting arm lower end for mounting the first vertical knife to the first mounting arm, a second vertical knife having a vertical surface, a front edge, a bottom edge portion and means joined to the second mounting arm lower end for mounting the second vertical knife to the second mounting arm, and a bottom cutting knife extending between and joined to the first and second vertical knives, with the bottom cutting knife having a first end portion joined to the first vertical knife and a second end portion joined to the second vertical knife more remote from the means for mounting the mounting arms than where the first end portion of the bottom cutting knife is joined to the first vertical knife, with the bottom cutting knife being planar between the first and second end portions, with the vertical surface of the first vertical knife from the first mounting arm lower end to the bottom edge portion being generally parallel to the vertical surface of the second vertical knife from the second mounting arm lower end to the bottom edge portion.

8. The combination of claim 7 wherein the sod cutting machine includes means for connecting the engine to the wheels for propelling the wheels to move the frame in a forward direction, and each of the vertical knives having a sharpened front edge.

9. The combination of claim 7 wherein the bottom edge portion of the second knife bottom edge portion is substantially more remote from the arm mounting means than the first vertical knife bottom edge portion.

10. The combination of claim 9 wherein each of the means joined to the mounting arm lower end includes a knife shank having bolt apertures and bolts extended through the apertures for securing the respective shank to the adjacent mounting arm, the bolt apertures of the first vertical knife being vertically more closely adjacent the first vertical knife bottom edge portion than the bolt apertures of the second vertical knife are from the second vertical knife bottom edge portion when the mounting arms are in their turf cutting position.

11. The combination of claim 10 wherein each of the vertical knife bottom edge portions extends substantially horizontally when the mounting arms are in their turf cutting position, the bolt apertures of each of the vertical knives being in the same spaced relationship to one another and the spacing of the bolt apertures of the second vertical knife being in substantially greater spaced relationship to its bottom edge portion in a vertical direction than the corresponding spacing of apertures of the first vertical knife from its bottom edge portion.

* * * * *